United States Patent Office 3,781,268
Patented Dec. 25, 1973

3,781,268
ANTIBIOTIC DERIVATIVES OF KANAMYCIN
Hiroshi Kawaguchi, Takayuki Naito, and Susumu Nakagawa, Tokyo, Japan, assignors to Bristol-Myers Company, New York, N.Y.
No Drawing. Continuation-in-part of abandoned application Ser. No. 162,315, July 13, 1971. This application Jan. 27, 1972, Ser. No. 221,378
Int. Cl. C07c 47/18
U.S. Cl. 260—210 AB   13 Claims

ABSTRACT OF THE DISCLOSURE

Derivatives of kanamycin A and B have been prepared which possess substantially improved antibacterial activity. An example of such an agent is 1-[L-(—)-γ-amino-α-hydroxybutyryl]-kanamycin A [IVa, BB–K8].

CROSS-REFERENCE TO RELATED APPLICATIONS

This application is a continuation-in-part of a copending application, Ser. No. 162,315, filed July 13, 1971, and now abandoned.

BACKGROUND OF THE INVENTION (1) Field of the invention

This invention relates to a semisynthetic 1-substituted derivatives of kanamycin A or B, said compounds being prepared by acylating the 1-amino-function of kanamycin A or B with a γ-amino-α-hydroxybutyryl moiety.

(2) Description of the prior art

The kanamycins are known antibiotics described in Merck Index, 8th ed., pp. 597–598. Kanamycin A is a compound having the formula

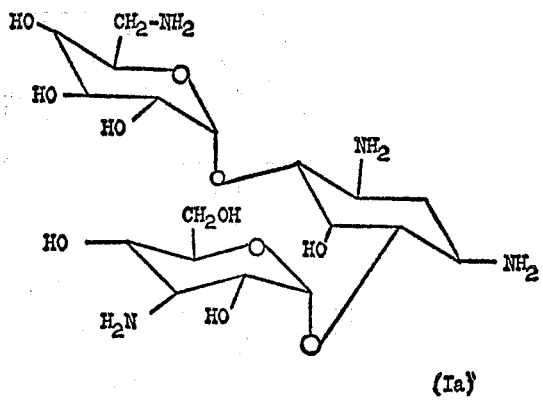

(Ia)

Kanamycin B is a compound having the formula

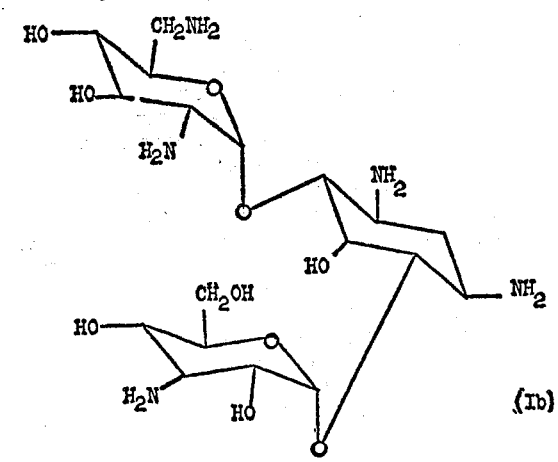

(Ib)

SUMMARY OF THE INVENTION

The compound having the formula

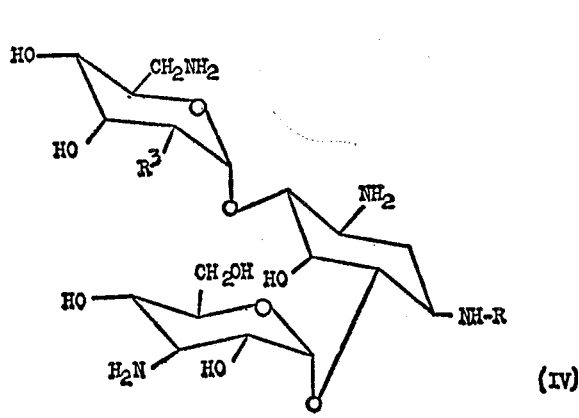

(IV)

in which $R^3$ is OH or $NH_2$ and R is L-(—)-γ-amino-α-hydroxybutyryl; or a nontoxic pharmaceutically acceptable acid addition salt thereof is a valuable antibacterial agent.

This invention relates to semi-synthetic derivatives of kanamycin A and B, said compounds being known as 1-[L-(—)-γ-amino-α-hydroxybutyryl]-kanamycin A and B and having the formula

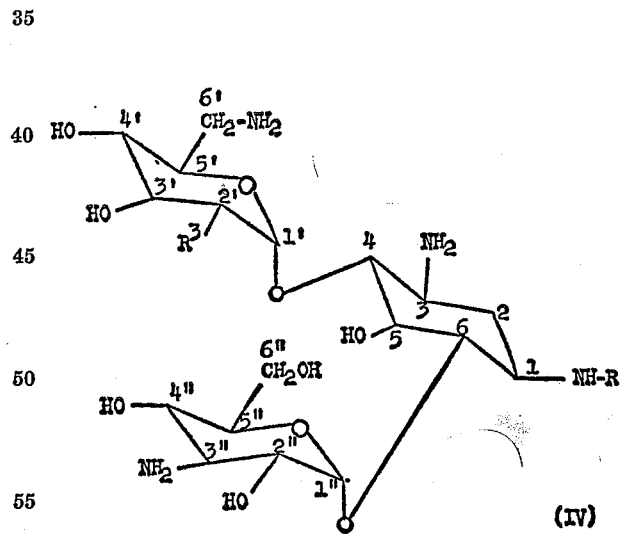

(IV)

in which $R^3$ is OH or $NH_2$ and R is L-(—)-γ-amino-α-hydroxybutyryl; or a nontoxic pharmaceutically acceptable acid addition salt thereof.

For the purpose of this disclosure, the term "nontoxic pharmaceutically acceptable acid addition salt" shall mean a mono-, di-, tri- or tetrasalt formed by the interaction of 1 molecule of compound IV with 1–4 moles of a nontoxic, pharmaceutically acceptable acid. Included among these acids are acetic, hydrochloric, sulfuric, maleic, phosphoric, nitric, hydrobromic, ascorbic, malic and citric acid, and those other acids commonly used to make salts of amine containing pharmaceuticals.

The compounds of the present invention are prepared by the following diagrammatic scheme:

(1) Kanamycin A (Ia) or Kanamycin B (Ib) →[N-(benzyloxycarbonyloxy) Succinimide]

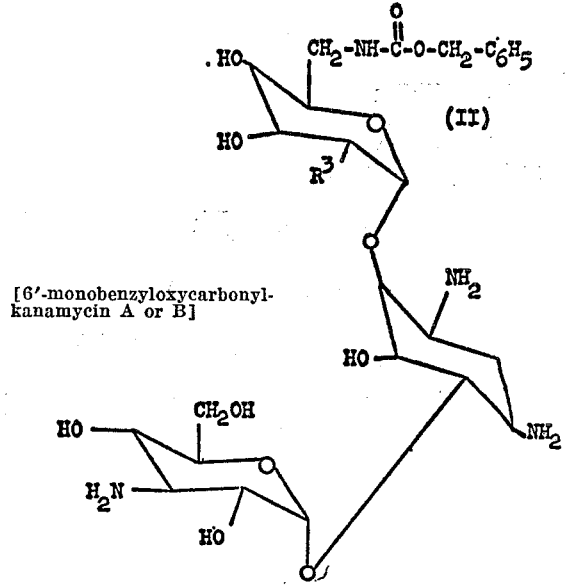

[6'-monobenzyloxycarbonyl-kanamycin A or B]

(2) Compound II →[N-hydroxysuccinimide ester of L-(−)-γ-benzyloxycarbonylamino-α-hydroxybutyric acid]

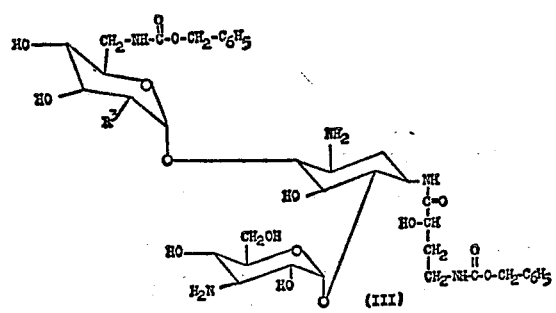

(3) Compound III →[H₂/Pd/C]

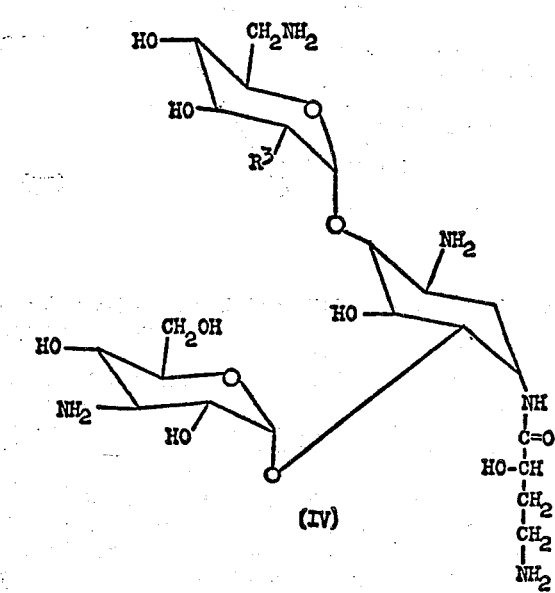

A preferred embodiment of the present invention is the compound having the formula

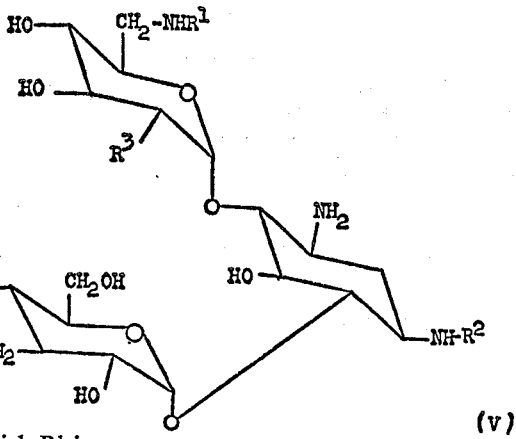

in which $R^1$ is

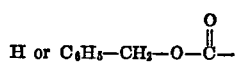

$R^2$ is H or L-(−)-γ-amino-α-hydroxybutyryl and $R^3$ is OH or $NH_2$ wherein $R^1$ or $R^2$ must be other than H; or a nontoxic pharmaceutically acceptable acid addition salt thereof.

Another preferred embodiment is the compound of Formula V in which $R^1$ is

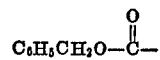

$R^2$ is H and $R^3$ is OH or $NH_2$.

A more preferred embodiment is the compound of Formula V in which $R^2$ is L-(−)-γ-amino-α-hydroxybutyryl, $R^1$ is hydrogen and $R^3$ is OH or $NH_2$.

A most preferred embodiment is the compound of Formula V wherein $R^1$ is H, $R^2$ is L-(−)-γ-amino-α-hydroxybutyl and $R^3$ is OH; nontoxic pharmaceutically acceptable acid addition salt thereof.

Another most preferred embodiment is the compound of Formula V wherein $R^1$ is H, $H^2$ is L-(−)-γ-amino-α-hydroxybutyryl and $R^3$ is $NH_2$; or a nontoxic pharmaceutically acceptable and addition salt thereof.

Other most preferred embodiments are the sulfate, hydrochloride, acetate, maleate, citrate, ascorbate, nitrate or phosphate salts of compound V.

Another most preferred embodiment is the monosulfate salt of compound V.

Still another preferred embodiment is the disulfate salt of compound V.

The objectives of the present invention have been achieved, by the provision according to the present invention of the process for the preparation of the compound having the formula

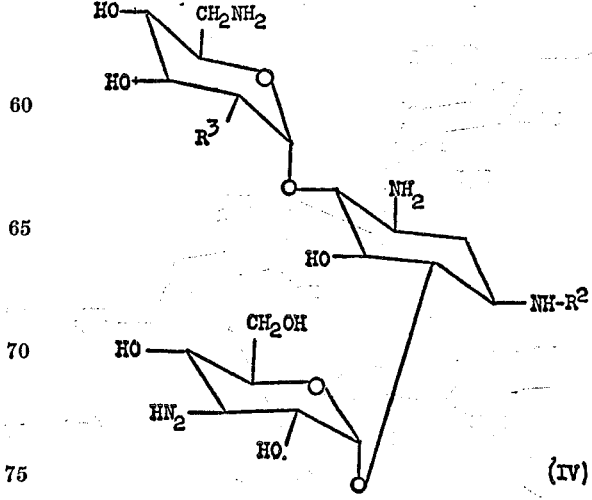

in which $R^2$ is L-(—)-γ-amino-α-hydroxybutyryl and $R^3$ is OH or $NH_2$; or a nontoxic pharmaceutically acceptable acid addition salt thereof; which process comprises the consecutive steps of (A) Acylating kanamycin A or kanamycin B with an acylating agent selected from the compounds having the formulas

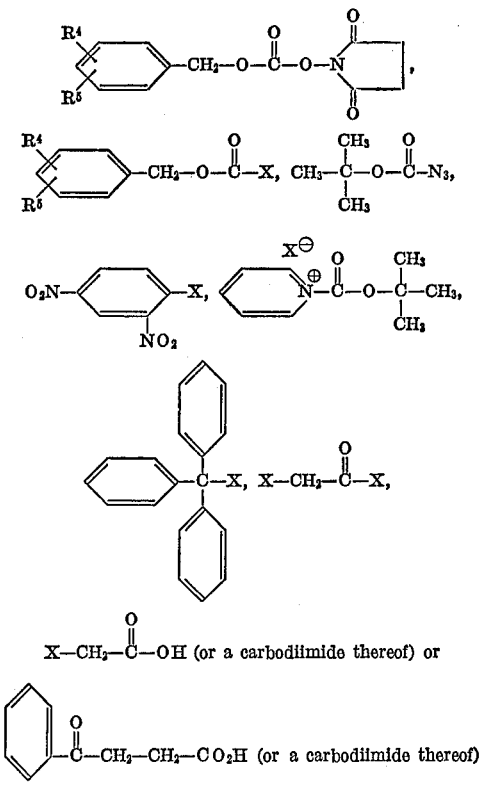

in which $R^4$ and $R^5$ are alike or different and each is H, F, Cl, Br, $NO_2$, OH, (lower)alkyl or (lower)alkoxy, X is chloro, bromo or iodo, or a functional equivalent as an acylating agent; in a ratio of 1 mole or less of acylating agent per mole of kanamycin A or B in a solvent, preferably selected from the group comprised of dimethylformamide, dimethylacetamide, tetrahydrofuran, dioxane, 1,2-dimethoxyethane, methanol, ethanol, water, acetone, pyridine, N-(lower)alkyl-piperidine, or mixtures thereof, but preferably dimethylformamide, at a temperature below 50° C. and preferably below 25° C., to produce the compound having the formula

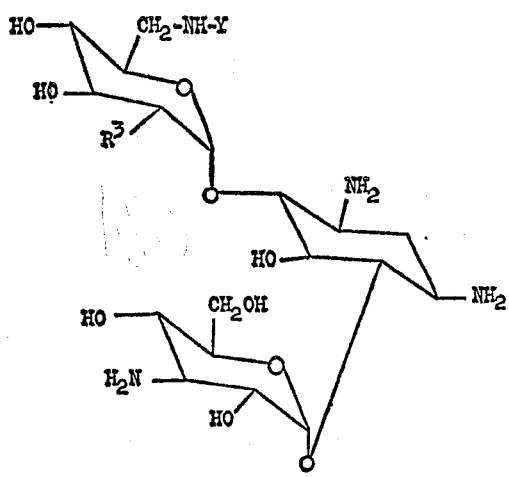

(II)

in which Y is a radical of the formula

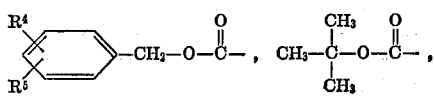

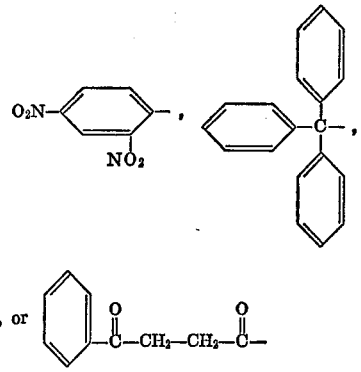

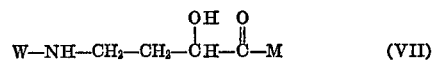

in which $R^4$, $R^5$ and $R^3$ are as defined above;

(B) Acylating compound II with an acylating agent having the formula

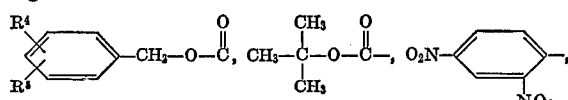    (VII)

in which W is a radical selected from the group comprising

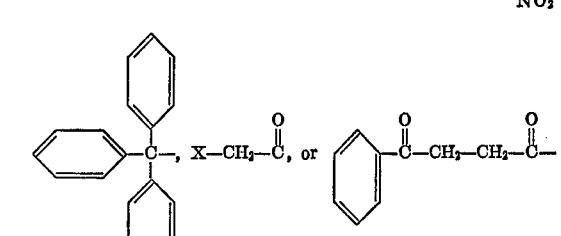

but preferably

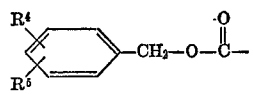

M is a radical selected from the group comprising

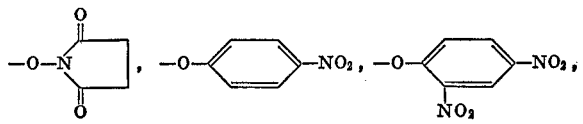

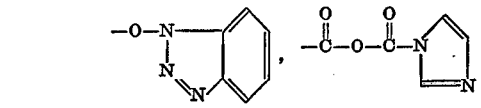

but preferably

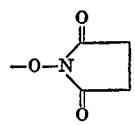

in which $R^4$ and $R^5$ are as above; in a ratio of at least 0.5 mole of compound VII per mole of compound II, but preferably in a ratio of about 0.5 to about 1.4, and most preferably in a ratio of about 0.8 to about 1.1, in a solvent preferably selected from the group comprising a mixture of water and ethyleneglycol dimethyl ether, dioxane, dimethylacetamide, dimethylformamide, tetrahydrofuran, propyleneglycol dimethyl ether, or the like but preferably 1:1 water-ethylene glycol dimethyl ether, to produce a compound of the formula

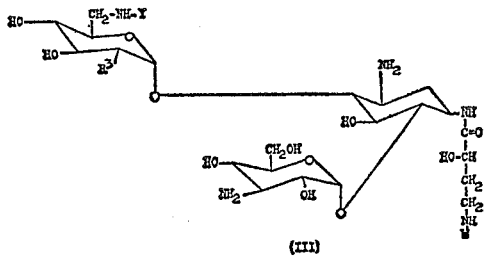

(III)

in which $R^3$, Y and W are as above; and (C) Removing the blocking groups W and Y from compound III by methods commonly known in the art, and preferably when W and Y are radicals of the formula

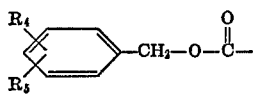

by hydrogenating compound III with hydrogen in the presence of a metal catalyst, preferably selected from the group comprising palladium, platinum, Raney nickel, rhodium, ruthenium and nickel, but preferably palladium, and most preferably palladium on charcoal, in a water-water miscible solvent system, preferably selected from the group comprising water and dioxane, tetrahydrofuran, ethyleneglycol dimethyl ether, propyleneglycol dimethyl ether, or the like, but preferably 1:1 water-dioxane, and preferably in the presence of a catalytic amount of glacial acetic acid to produce the compound of Formula IV.

It should be apparent to those knowledgeable in the art that other agents can be used in the process above to acylate the amine functions of the intermediate compounds of the instant invention. This disclosure is meant to include all such acylating agents that produce labile amine blocking groups, said labile blocking groups commonly employed in the synthesis of peptides. The labile blocking groups must be readily removable by methods commonly known in the art. Examples of said labile blocking groups and their removal can be found in the review of A. Kapoor, J. Pharm. Sciences, 59, pp. 1–27 (1970). Functional equivalents as acylating agent for primary amine groups would include corresponding carboxylic chlorides, bromides, acid anhydrides, including mixed anhydrides and particularly the mixed anhydrides prepared from stronger acids such as the lower aliphatic monoesters of carbonic acid, of alkyl and aryl sulfonic acids and of more hindered acids such as diphenylacetic acid. In addition, an acid azide or an active ester of thioester (e.g., with p-nitrophenol, 2,4-dinitrophenol, thiophenol, thioacetic acid) may be used or the free acid itself may be coupled with the kanamycin derivative (II) after first reacting said free acid with N,N'-dimethylchloroforminium chloride [cf. Great Britain 1,008,170 and Novak and Weichet, Experientia, XXI/6, 360 (1965)] or by the use of enzymes or of an N,N'-carbonyldiimidazole or an N,N'-carbonylditriazole [cf. Sheehan and Hess, J. Amer. Chem. Soc., 77, 1067 (1955)] or of alkynylamine reagent [cf. R. Buijile and H. G. Viehe, Angew. Chem., International Edition 3, 582 (1964)], or of a ketenimine reagent [cf. C. L. Stevenes and M. E. Monk, J. Amer. Chem. Soc., 80, 4065 (1958)] or of an isoxazolium salt reagent [cf. R. B. Woodward, R. A. Olofson and H. Mayer, J. Amer. Chem. Soc., 83, 1010 (1961)]. Another equivalent of the acid chloride is a corresponding azolide, i.e., an amide of the corresponding acid whose amide nitrogen is a member of a quasiaromatic five membered ring containing at least two nitrogen atoms, i.e., imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, midazole, precipitates and may be separated and the imidazolide isolated, but this is not essential. These reaction are well-known in the art (cf. U.S. Pat. Nos. 3,079,314, 3,117,126 and 3,129,224 and British Pat. Nos. 932,644, 957,570 and 959,054).

Compound IVa, 1-[L-(−)-γ-amino-α-hydroxybutyryl]-kanamycin A, possesses excellent antibacterial activity that appears superior to kanamycin A itself. Illustrated below are two tables showing the minimal inhibitory concentrations (MIC's) of kanamycin A and compound IVa (BB–K8) against a variety of Gram-positive and Gram-negative bacteria as obtained by the Steers agar-dilution method (Table 1) and the two-fold dilution method (Table 2). Mueller-Hinton Agar Medium was used in the study of Table 1 and Heart Infusion Broth was used in the study of Table 2.

TABLE 1

| | | MIC, mg./ml. | |
|---|---|---|---|
| | Organism | Kanamycin A (6-8198) | Compound IVa [BB–K8], lot No. 4 |
| 1 | Alk. faecalis A-9423 | 16 | 8 |
| 2 | Alk. faecalis A-20648 | >125 | >125 |
| 3 | Ent. cloacae A-9656 | 4 | 4 |
| 4 | Ent. species A-20364 | >125 | 2 |
| 5 | Ent. hafniae 1 A-20674 | 1 | 1 |
| 6 | E. coli A-0636 | 2 | 1 |
| 7 | E. coli A-20664 | 16 | 4 |
| 8 | E. coli A-20665 | >125 | 1 |
| 9 | E. coli A-20507 | 32 | 2 |
| 10 | E. coli A-20520 | >125 | 4 |
| 11 | E. coli A-20365 | >125 | 1 |
| 12 | E. coli A-20684 | 2 | 2 |
| 13 | E. coli A-20682 | >125 | 2 |
| 14 | E. coli A-20683 | >125 | 8 |
| 15 | E. coli A-20681 | >125 | 2 |
| 16 | E. coli A-15119 | 4 | 4 |
| 17 | K. pneumoniae A-9867 | 4 | 4 |
| 18 | K. species A-20328 | >125 | 2 |
| 19 | K. species A-20330 | 32 | 32 |
| 20 | K. species A-20634 | >125 | 4 |
| 21 | K. pneumoniae A-20680 | >125 | 4 |
| 22 | K. pneumoniae A-9977 | 1 | 1 |
| 23 | Pr. mirabilis A-9900 | 2 | 2 |
| 24 | Pr. morganii A-15153 | 2 | 2 |
| 25 | Pr. vulgaris A-9555 | 2 | 1 |
| 26 | Pr. rettgeri A-9636 | 0.25 | 0.25 |
| 27 | Pr. mirabilis A-20645 | 4 | 4 |
| 28 | Pr. mirabilis A-20454 | 2 | 2 |
| 29 | Providencia stuartii A-20615 | 2 | 1 |
| 30 | Providencia alkalifaciens A-20676 | 1 | 1 |
| 31 | Ps. aeruginosa A-20229 | 32 | 2 |
| 32 | Ps. aeruginosa A-9843A | 125 | 16 |
| 33 | Ps. aeruginosa A-20653 | >125 | 32 |
| 34 | Ps. species A-20601 | 125, 63 | 16 |
| 35 | Ps. species A-20621 | >125 | >125 |
| 36 | Ps. maltophilia A-20620 | 32 | >125 |
| 37 | Sal. enteritidis A-9531 | 1 | 0.5 |
| 38 | Sal. derby A-20087 | >125 | 1 |
| 39 | Ser. marcescens A-20019 | 2 | 4 |
| 40 | Ser. marcescens A-9933 | 4 | 8 |
| 41 | Ser. marcescens A-20460 | >125 | 42 |
| 42 | Ser. marcescens A-20459 | 4 | 16 |
| 43 | Shig. flexneri A-9684 | 4 | 4 |
| 44 | Aeromonas sp. A-20670 | 2 | 2 |
| 45 | Arizona sp. A-20671 | 2 | 1 |
| 46 | Citrobacter sp. A-20673 | 4 | 4 |
| 47 | Edwardsiella sp. A-20678 | 4 | 4 |
| 48 | Staph. aureus A-9606 | 1 | 1 |
| 49 | Staph. aureus A-4749 | 0.5 | 1 |
| 50 | Staph. aureus A-9537 | 2 | 1 |
| 51 | Staph. aureus A-20610 | >125 | 2 |
| 52 | Staph. aureus A-20240 | >125 | 8 |
| 53 | Staph. aureus A-15197 | 1 | 2 |
| Mueller-Hinton Medium +4% sheep blood | | | |
| 54 | Str. faecalis A-9854 | 63 | 63 |
| 55 | Str. faecalis A-9575 | 125 | >125 |
| 56 | Str. pyogenes A-20200 | 32, 16 | 32 |
| 57 | Str. pyogenes A-9604 | 125 | 125 |
| 58 | Str. pyogenes A-15040 | 125 | 125 |
| 59 | Str. pyogenes A-20065 | 125 | 125 |
| 60 | D. pneumoniae A-9585 | 63, 32 | 63 |
| 61 | D. pneumoniae A-20159 | >125 | >125 |

TABLE 2

| | MIC, mg./ml. | |
|---|---|---|
| Organism | Kanamycin A (6-8196) | Compound IVa [BB-K8] lot No. 4 |
| 1... D. pneumoniae +5% serum A-9585.. | 63 | 63 |
| 2... Str. pyrogenes ±5% serum A-9604... | 125 | 125 |
| 3... Staph. aureus Smith A-9537 | 0.5 | 0.5 |
| 4... Staph. aureus A-9497 | 0.5 | 0.5 |
| 5... Staph. aureus A-20239 | >125 | 4 |
| 6... Staph. aureus A-20240 | >125 | 4 |
| 7... Enter. cloacae A-0656 | 2 | 2 |
| 8... Enter. species A-20364 | >125 | 2 |
| 9... K. pneumoniae A-9867 | 2 | 4 |
| 10.. E. coli K-12 ML1410 A-20361 | 2 | 4 |
| 11.. E. coli K-12 ML1630 A-20363 | >125 | 2 |
| 12.. E. coli K-12 A-9632 | 2 | 1 |
| 13.. E. coli A-20664 | 32 | 8 |
| 14.. E. coli A-20665 | >125 | 8 |
| 15.. Pr. mirabilis A-9900 | 2 | 16 |
| 16.. Pr. morganii A-15153 | 4 | 16 |
| 17.. Pr. vulgaris A-9436 | 1 | 2 |
| 18.. Ps. aeruginosa A-20227 | 4 | 1 |
| 19.. Ps. species A-20499 | 63 | 4 |
| 20.. Ps. aeruginosa A-20653 | >125 | 4 |
| 21.. Ps. species A-20621 | >125 | >125 |
| 22.. Ser. marcescens A-20019 | 2 | 4 |
| 23.. Ser. marcescens A-20141 | 16 | 16 |

The above MIC data show that compound IVa (BB-K8) is superior to kanamycin A in activity, particularly against kanamycin A resistant organisms.

The MIC data also correlate well with the in vivo results for all three organisms against which kanamycin A and compound IVa were tested.

Compound IVa and kanamycin A were equally effective in infections of mice caused by kanamycin A-sensitive strains of E. coli A15119 and Staph. aureus A9537. Although the $CD_{50}$ values (curative dose in 50% of mice lethally infected) for Staph. aureus A9537 suggest that compound IVa is slightly less active than kanamycin A; this small difference is probably not significant because the dose levels were far apart (5×-dilutions).

Against the kanamycin-resistant strain of E. coli A20520, kanamycin A as expected, was not effective in vivo, whereas compound IVa demonstrated a marked protective action. Compound IVa was approximately 10 times more active against this E. coli strain when administered in a 4-treatment regimen rather than in a 2-treatment one.

TABLE 3

A comparison of in vitro and in vivo activities of Compound IVa and Kanamycin A

| Compounds | Test No. | Staphyloccus aureus A9537 | | Escherichia coli A15119 | | Escherichia coli A20520 | |
|---|---|---|---|---|---|---|---|
| | | MIC[a] | CD$_{50}$[b] | MIC | CD$_{50}$ | MIC | CD$_{50}$ |
| Compound IV | 1 | 1 | 2.0×2 | 2 | 2×2 | 2 | 66×2 |
| | 2 | (c) | | | | | 5×4 |
| Kanamycin A | 1 | 2 | 0.5×2 | 4 | 4×2 | 125 | 200×2 |
| | 2 | | | | | | 200×4 |

[a] MIC=minimum inhibitory concentration (μg./ml.). Tests conducted as described by Chrisholm et al,. (Antimicrob. agents and Chemotherapy—1969, p. 244. 1970) using Mueller-Hinten agar as the test medium.
[b] CD$_{50}$=Curative dose, 50% (mg./kg./treated times number of treatments). Mice were treated subcutaneously at 1 and 4 hours post-infection when 2 treatments were administered and at 0, 2, 4, and 6 hours post-infection when 4 treatments were given. Other aspects of the test were carried out as described by Price et al. (J, of antibiotics 22:1. 1969).
[c] =Not tested, The compounds IV are valuable as antibacterial agents, nutritional supplements in animal feeds, therapeutic agents in poultry and animals, including man, and are especially valuable in the treatment of infectious diseases caused by Gram-positive and Gram-negative bacteria.

The compounds IV when administered orally are useful as an adjunctive treatment for preoperative sterilization of the bowel. Both aerobic and anaerobic flora which are suseptible to these drugs are reduced in the large intestine. When accompanied by adequate mechanical cleansing, they are useful in preparing for colonic surgery.

The compounds IV are effective in the treatment of systemic bacterial infections when administered parenterally in the dosage range of about 250 mg. to about 3000 mg. per day in divided doses three or four times a day. Generally the compounds are effective when administered at a dosage of about 5.0 to 7.5 mg./kg. of body weight every 12 hours.

Compound IVb, 1-[L-(—)-γ-amino-α-hydroxybutyryl]-kanamycin B, possesses excellent antibacterial activity that appears superior to kanamycin A. Illustrated below is Table 4 showing the minimal inhibitory concentrations (MIC's) of kanamycin A and compound IVb (BB-K26) against a variety of Gram-positive and Gram-negative bacteria. The MIC's are obtained by the Steers agar-dilution method (Table 4) on nutrient agar medium.

TABLE 4

| | | | MIC (mg./ml.) | |
|---|---|---|---|---|
| Organism | Bristol Code No. | Resist. to— | BBK-26 | Kanamycin A |
| E. coli N1HJ | | | 0.4 | 0.8 |
| E. coli Juhl | A15119 | | 1.6 | 0.8 |
| Do | A15169 | | 1.6 | 1.6 |
| Do | A20363 | KM | 0.8 | 50 |
| Do | A9844 | | 0.8 | 0.8 |
| Do | A20365 | KM | 0.4 | >50 |
| E. coli K-12 | | | 0.8 | 0.4 |
| Do | A20664 | KM | 0.8 | 3.1 |
| Do | A20665 | KM | 0.8 | 50 |
| K. pneumoniae D11 | | | 0.2 | 0.2 |
| Do | A9678 | | 0.8 | 0.8 |
| S. margesgens | A20019 | | 1.6 | 1.6 |
| Ps. aeruginosa D15 | | | 3.1 | 12.5 |
| Ps. aeruginosa D113 | | KM | 50 | >50 |
| Do | A9923 | | 1.6 | 25 |
| Do | A9930 | | 0.8 | 6.3 |
| Do | A15150 | | 6.3 | 25 |
| Do | A15194 | | 1.6 | 12.5 |
| Do | A20479 | KM | 1.6 | 50 |
| Do | A20616 | KM | 3.1 | 25 |
| Do | A20653 | KM | 25 | 50 |
| Do | A9843 | | 1.6 | 12.5 |
| Pseudomonas sp | A20355 | | 1.6 | 6.3 |
| Do | A20358 | KM | 3.1 | 12.5 |
| Do | A20368 | GM | 50 | 25 |
| Do | A20598 | GM | 6.3 | 25 |
| Do | A20600 | GM | 3.1 | 12.5 |
| Do | A20603 | GM | 6.3 | >50 |
| Do | A20618 | GM | 50 | 50 |
| Pr. vulgaris | A9436 | | 1.6 | 0.8 |
| Do | A9526 | | 0.8 | 0.8 |
| Pr. mirabilis | A9554 | | 1.6 | 1.6 |
| Do | A9900 | | 1.6 | 1.6 |
| Pr. morganii | A9553 | | 1.6 | 1.6 |
| Do | A20031 | | 6.3 | 3.1 |
| Pr. rettgeri | A15167 | | 0.8 | 0.8 |
| S. aureus 209P | | | 1.6 | 0.8 |
| S. aureus Smith | | | 0.8 | 0.4 |
| S. aureus 209P | | | 1.6 | 0.8 |
| Do | A20239 | KM | 1.6 | 25 |
| S. lutea PC1-1001 | | | 1.6 | 3.1 |
| M. flavus | | | 0.4 | 0.8 |
| B. subtilis PC1-219 | | | 0.1 | 0.1 |
| St. pyogenes S-23 | | | 25 | 25 |
| St. pyogenes Dick | | | 1.6 | 1.6 |
| St. pyogenes Digonnet | A9604 | | 12.5 | 25 |
| Do | A20065 | | 25 | 25 |
| D. pneumoniae | | | 50 | 25 |
| Mycobacterium 607 | | | 6.3 | 0.8 |
| Mycobacterium 607 D105 | | KM | >100 | >100 |
| Mycobacterium 607 D107 | | KM | >100 | >100 |
| Mycobacterium phlei | | | 1.6 | 1.6 |
| Mycobacterium ranae | | | 6.3 | 1.6 |
| Mycobacterium H$_{37}$Rv* | | | 0.8 | 0.4 |

*Determined by tube dilution method.
NOTE.—KM is kanamycin A; GM is gentamycin.

The above MIC data show that compound IVb (BB-K26) is superior to kanamycin A in activity, particularly against kanamycin A-resistant organisms.

An in vivo evaluation of compound IVb was carried out against both kanamycin B-sensitive and resistant strains of E. coli and Ps. aerugenosa.

The organisms are designated as follows:

| Code No. | | Kanamycin sensitivity |
|---|---|---|
| E. coli Juhl | A15119 | Sensitive. |
| E. coli ML-1630 | A20363 | Resistant (phosphorylation). |
| Ps. aeruginosa D15 | | Moderately resistant. |
| Ps. aeruginosa D113 | | Highly resistant (phosphorylation). |

Compound IVb showed slightly better activity against equally effective against E. coli Juhl A15119 at a dose of 6.3 mg./kg. in mice. Compound IVb was most effective against kanamycin B resistant E. coli ML-1630 at a dose of 6.3 mg./kg. vs. 100–400 mg./kg. for kanamycin B.

Compound IBb showed slightly better activity against moderately resistant Ps. aeruginosa D15 than kanamycin B. Compound IVb showed substantially better activity against highly resistant Ps. aeruginosa D-113 than kanamycin B (see Table 5 below).

TABLE 5

| Dose (s.c.), mg./kg. | E. coli Juhl A15119 | | E. coli ML-1630 | |
|---|---|---|---|---|
| | BB-K26 | KM-B | BB-K26 | KM-B |
| 400 | | | | 2/5 |
| 100 | 5/5 | 5/5 | 5/5 | 2/5 |
| 25 | 5/5 | 5/5 | 5/5 | 0/5 |
| 6.3 | 5/5 | 5/5 | 5/5 | 0/5 |
| 1.6 | 0/5 | 0/5 | 2/5 | |
| CD$_{50}$ | 3.1 | 3.1 | 1.8 | ca. 300 |

| Dose (s.c.), mg./kg. | Ps. aeruginosa D15 | | Doses (s.c.), mg./kg. | Ps. aeruginosa D-113 | |
|---|---|---|---|---|---|
| | BB-K26 | KM-B | | BB-K26 | KM-B |
| 100 | 5/5 | 5/5 | 400 | | 0/5 |
| 25 | 1/5 | 0/5 | 200 | 3/5 | |
| 6.3 | 1/5 | 0/5 | 50 | 1/5 | |
| 1.6 | 0/5 | 0/5 | 12.5 | 0/5 | |
| CD$_{50}$ | 38 | 50 | 3.1 | 0/5 | |
| | | | CD$_{50}$ | 145 | >400 |

NOTE.—KM-B is kanamycin B. The figures shown as 0/5, 1/5, 5/5, etc., indicate the number of surviving animals per five animals challenged; for example, 5/5 indicates 5 of 5 animals surviving the lethal dose of challenge organism when treated with kanamycin B or BB-K26.

The compounds of the present invention are the subject matter of our co-pending U.S. patent application, Ser. No. 162,315, filed July 13, 1971. Subsequent to filing the parent application, it was determined that the wrong structures were assigned to the compounds of the present invention. It was originally thought the L-(—)-γ-amino-α-hydroxybutryl moiety was on the 3″ position of kanamycin A and B, when in fact the process of production, as illustrated by the examples, placed the L-(—)-γ-amino-α-hydroxybutyryl moiety on the 1-position. While the compounds claimed herein were in fact produced by the process of the parent application and are described therein, those compounds were mistakenly identified as to their structure in the parent application.

EXAMPLES

Example 1

Preparation of L-(—)-γ-benzyloxycarbonylamino-α-hydroxybutyric acid (VI).—L-(—)-γ-amino-α-hydroxybutyric acid (7.4 g., 0.062 mole was added to a solution of 5.2 g. (0.13 mole) of sodium hydroxide in 50 ml. of water. To the stirred solution was added dropwise at 0–5° C. over a period of 0.5 hour, 11.7 g. (0.068 mole) of carbobenzoxy chloride and the mixture was continued to stir for one hour at the same temperature. The reaction mixture was washed with 50 ml. of ether, adjusted to pH 2 with dilute hydrochloric acid and extracted with four 80-ml. portions of ether. The ethereal extracts were combined, washed with a small amount of saturated sodium chloride solution, dried with anhydrous sodium sulfate and filtered. The filtrate was evaporated in vacuo and the resulting residue was crystallized from benzene to give 11.6 g. (74%) of colorless plates; melting point 78.5–79.5° C., [α]$_D$=4.5° (c.=2, CH$_3$OH). Infrared (IR) [KBr]: IR (KBr) γ$_{C=O}$ 1740, 1690 cm.$^{-1}$. Nuclear magnetic resonance (NMR) (acetone-d$_6$) δ (in p.p.m. from TMS) 2.0 (2H, m.), 3.29 (2H, d-d, J=6.7 and 12 Hz.), 4.16 (1H, d-d, J=4.5 and 8 Hz.), 4.99 (2H, s.), 6.2 (2H, broad), 7.21 (5H, s.).

Analysis.—Calcd. for C$_{12}$H$_{15}$NO$_5$ (percent): C, 56.91; H, 5.97; N, 5.53. Found (percent): C, 56.66; H, 5.97; N, 5.47.

Example 2

N-hydroxysuccinimide ester of L-(—)-γ-benzyloxycarbonylamino-α-hydroxybutyric acid (VII).—A solution of 10.6 g. (0.042 mole) of VI and 4.8 g. (0.042 mole) of N-hydroxysuccinimide [1] in 200 ml. of ethyl acetate was cooled to 0° C. and then 8.6 g. (0.042 mole) of dicyclohexylcarbodiimide was added. The mixture was kept overnight in a refrigerator. The dicyclohexylurea which separated was filtered off and the filtrate was concentrated to about 50 ml. under reduced pressure to give colorless crystals of VII which were collected by filtration; 6.4 g., M.P. 121–122.5° C. The filtrate was evaporated to dryness in vacuo and the crystalline residue was washed with 20 ml. of a benzene-n-hexane mixture to give an additional amount of VII. The total yield was 13.4 g. (92%). [α]$_D$ 1.5° (c.=2, CHCl$_3$). IR (KBr) γ$_{C=O}$ 1810, 1755, 1740, 1680 cm.$^{-1}$. NMR (acetone-d$_6$) δ (in p.p.m. from TMS) 2.0 (2H, m.), 2.83 (4H, s.), 3.37 (2H, d-d, J=6.5 and 12.5 Hz.), 4.56 (1H, m.), 4.99 (2H, s.), 6.3 (2H, broad), 7.23 (5H, s.).

Analysis.—Calcd. for C$_{16}$H$_{18}$N$_2$O$_7$ (percent): C, 54.85; H, 5.18; N, 8.00. Found (percent): C, 54.79, 54.70; H, 5.21, 5.20; N, 8.14, 8.12.

Example 3

Preparation of 1 - [L - (—)-γ-benzyloxycarbonylamino-α-hydroxybutyryl] - 6′ - carbobenzoxykanamycin A (IIIa).—A solution of 1.6 g. (4.6 mmoles) of VII in 40 ml. of ethyleneglycol dimethyl ether (DME) was added dropwise to a stirred solution of 2.6 g. (4.2 mmoles) of 6′-monobenzyloxycarbonylkanamycin A (II) in 40 ml. of 50% aqueous ethyleneglycol dimethyl ether and the mixture was stirred overnight. The reaction mixture was evaporated under reduced pressure to give a brown residue of IIIa which was used for the next reaction without further purification.

Example 4

Preparation of 1 - [L-(—)-γ-amino-α-hydroxybutyryl]-kanamycin A (IVa).—The crude product IIIa from Example 3 was dissolved in 40 ml. of 50% aqueous dioxane and a small amount of insoluble material was removed by filtration. To the filtrate was added 0.8 ml. of glacial acetic acid and 1 g. of 10% palladium-on-charcoal and the mixture was hydrogenated at room temperature for 24 hours in a Parr hydrogenation apparatus. The reaction mixture was filtered to remove the palladium catalyst and the filtrate was evaporated to dryness in vacuo. The residue was dissolved in 30 ml. of water and chromatographed on a column of CG–50 ion exchange resin (NH$_4$$^+$ type, 50 cm. x 1.8 cm.). The column was washed with 200 ml. of water and then eluted with 800 ml. of 0.1 N NH$_4$OH, 500 ml. of 0.2 N NH$_4$OH and finally 500 ml. of 0.5 N NH$_4$OH. Ten-milliliter fractions were collected and fractions 146 to 154 contained 552 mg. (22%, based on carbobenzoxy kanamycin A, II) of the product IV which was designated BB–K8 lot 2. M.P. 187° (dec.). Relative potency against B. subtilis (agar plate)=560 mcg./mg. (standard: kanamycin A free base).

A solution of 250 mg. of BB–K8 lot 2 in 10 ml. of water was subjected to chromatography on a column of CG–50 (NH$_4$$^+$ type, 30 cm. x 0.9 cm.). The column was washed with 50 ml. of water and then eluted with 0.2 N NH$_4$OH. Ten milliliter fractions were collected. Fractions 50 to 63 were combined and evaporated to dryness under reduced pressure to give 98 mg. of the pure product, K8 lot 2-1. M.P. 194° (dec.). [α]$_D^{21}$ +85° (c.=2, H$_2$O). Relative potency against B. subtilis (agar plate)=960 mcg./mg. (standard: kanamycin A free base).

Analysis.—Calcd. for C$_{22}$H$_{43}$N$_5$O$_{13}$·2H$_2$CO$_3$ (percent): C, 40.62; H, 6.68; N, 9.87. Found (percent): C, 40.21, 39.79; H, 6.96, 6.87; N, 9.37, 9.49.

Example 5

Preparation of N - (benzyloxycarbonyloxy)succinimide.—N-hydroxysuccinimide [2] (23 g., 0.2 mole) was dissolved in a solution of 9 g. (0.22 mole) of sodium hydroxide in 200 ml. of water. To the stirred solution was

---

[1] G. W. Anderson et al., J. Am. Chem. Soc., 86, 1839 (1964).

[2] G. W. Anderson et al., J. Am. Chem. Soc., 86, 1839 (1964).

added dropwise 34 g. (0.2 mole) of carbobenzoxy chloride with water-cooling and then the mixture was stirred at room temperature overnight to separate the carbobenzoxy derivative which was collected by filtration, washed with water and air-dried. Yield 41.1 g. (82%). Recrystallization from benzene-n-hexane (10:1) gave colorless prisms melting at 78–79° C.

Example 6

Preparation of 6'-carbobenzoxykanamycin A.—A solution of 42.5 g. (90 mmoles) of kanamycin A free base in 450 ml. of water and 500 ml. of dimethylformamide (DMF) was cooled below 0° C. and stirred vigorously. To the solution was added dropwise over a period of about two hours a solution of 22.4 g. (90 mmoles) of N-(benzyloxycarbonyloxy)succinimide in 500 ml. of DMF. The mixture was stirred at $-10°$ to 0° C. overnight and then at room temperature for one day. The reaction mixture was evaporated under reduced pressure below about 50° C. The oily residue was dissolved in a mixture of 500 ml. water and 500 ml. butanol, the mixture being filtered to remove insoluble material and separated into two layers. The butanol and aqueous layers were treated with butanol-saturated water (500 ml.× 2) and water-saturated butanol (500 ml.× 2), respectively, using a technique similar to counter current distribution. The three aqueous layers were combined and evaporated to dryness under reduced pressure to give an oily residue, a part of which crystallized on standing at room temperature. To the residue including the crystals was added about 100 ml. of methanol, which dissolved the oil and separated it from the crystals. After adding about 300 ml. of ethanol, the mixture was kept at room temperature overnight to give a crystalline mass which was collected by filtration. It weighed 44 g. The product contained a small amount of kanamycin A as indicated by thin layer chromatography using n - propanol - pyridine - acetic acid-water (15:10:3:12) as the solvent system and Ninhydrin as the spray reagent.

The crude product was dissolved in 300 ml. of water and chromatographed on a column (30 mm. diameter) of CG–50 ion-exchange resin ($NH_4^+$ type, 500 ml.). The column was irrigated with 0.1 N ammonium hydroxide solution and the eluate was collected in 10-ml. fraction. The desired product was contained in tube numbers 10–100, while kanamycin A recovered from slower-moving fractions and the position isomer(s) of the product seemed to be contained in the faster-moving fractions. The fractions 10–110 were combined and evaporated to dryness under reduced pressure to give 24.6 g. (45%) of a colorless product 6-carbobenzoxykanamycin A (II) [6'-Cbz-kanamycin A], which began to melt and color at 204° C. and decomposed at 212° C. with gas evolution. $[\alpha]_D$ +106° (c.=2, $H_2O$).

| TLC (silica gel $F_{254}$; Ninhydrin) solvent system | Rf value | |
|---|---|---|
| | 6'-Cbz-Kanamycin A | Kanamycin A |
| n-PrOH-pyridine-AcOH—$H_2O$ (15:10:3:12) | [1] 0.42 [2] 0.33 [2] 0.15 | 0.04 |
| Acetone-AcOH–$H_2O$ (20:6:74) | 0.24 | 0.14 |
| $CHCl_3$-MeOH-c.$NH_4OH$—$H_2O$ (1:4:2:1) | 0.76 | 0.50 |
| AcOMe-n-PrOH-c.$NH_4OH$ (45:105:60) | [3] 0.22 | [3] 0.04 |

[1] Main.
[2] Minor.
[3] Detected by anthrone-sulfuric acid.

The final product was found to be accompanied by two minor components by TLC with one of the solvent systems tested. However, the final product was used without further purification for the preparation of BB–K8 (I).

Example 7

Preparation of L-(−)-γ-amino-α-hydroxybutyric acid from ambutyrosin A or B or mixtures thereof.—Ambutyrosin A (5.0 gm.) [U.S. Pat. No. 3,541,078, issued Nov. 17, 1970] was refluxed with 160 ml. of 0.5 N sodium hydroxide for one hour. The hydrolysate was neutralized with 6 N HCl and chromatographed on a column of CG–50 ($NH_4^+$ type). The desired L-(−)-γ-amino-α-hydroxybutyric acid was isolated by developing the column with water and removing the water by freeze drying. The L-(−)-γ-amino-α-hydroxybutyric acid is characterized as a crystalline material having a M.P. of 212.5–214.5° C. [column 2, lines 31–38, U.S. Pat. No. 3,541,078].

Example 8

Preparation of 6'-carbobenzoxykanamycin B.—To a chilled solution of 8.1 g. (0.0168 mole) of kanamycin B in 120 ml. of water and 80 ml. of 1,2-dimethoxyethane was added dropwise with stirring a solution of 4.2 g. (0.0168 mole) of N-(benzyloxycarbonyloxy)succinimide in 40 ml. of 1,2-dimethoxyethane. The reaction mixture was stirred overnight and evaporated under reduced pressure. The residue was dissolved in 100 ml. of water and shaken twice with 50 ml. of water-saturated n-butanol. The aqueous layer was separated and adsorbed on a column of 100 ml. of CG–50 ($NH_4^+$ type). The column was washed with 200 ml. of water, eluted with 0.05 N $NH_4OH$. The eluate was collected in 10-ml. fraction. Fractions 121 to 180 were collected, evaporated and freeze-dried to give 1.58 g. (15%) of the desired product. Fractions 1 to 120 were evaporated and re-chromatographed on CG–50 ($NH_4^+$) to give 1.21 g. (12%) of the product. M.P. 151–152° C. (dec.). $[\alpha]_D^{24}$ +104° (c.=2.5, $H_2O$). $\gamma_{C=O}$ 1710 cm.$^{-1}$.

Analysis.—Calcd. for $C_{26}H_{43}N_4O_{12}$ (percent): C, 50.56; H, 7.02; N, 11.34. Found (percent): C, 50.71; H, 7.38; N, 11.48.

TLC (silica gel F254), Rf 0.03 in n-PrOH-AcOH-$H_2O$ (15:10:3:12); Rf 0.16 in acetone-AcOH-$H_2O$ (20:6:74).

Example 9

Preparation of 1-[L-(−)-γ-benzyloxycarbonylamino-α-hydroxybutyryl] - 6' - carbobenzoxykanamycin B (IIIb).—To a stirred solution of 1.85 g. (3.0 mmoles) of 6'-carbobenzoxykanamycin B in 40 ml. of $H_2O$ and 50 ml. of 1,2-dimethoxyethane was added all at once at 5° C. 1.1 g. (3.1 mmoles) of N-(L-γ-carbobenzoxyamino-α-hydroxybutyryloxy)succinimide. The reaction mixture was stirred overnight at room temperature and subjected to hydrogenolysis without isolating the carbobenzoxy derivative (IIIb). TLC (silica gel F254), Rf 0.06 (starting material), 0.41, 0.57 (n-PrOH-pyridine-AcOH-$H_2O$=15:10:3:12), Rf 0.11 (starting material) 0.21, 0.34, 0.46 (acetone-AcOH-$H_2O$=20:6:74).

Example 10

Preparation of 1-[L-(−)-γ-amino-α-hydroxybutyryl]-kanamycin B (IVb).—To the solution obtained in Example 9 was added 0.2 g. of 10% palladium on charcoal. After the mixture was hydrogenated under atmospheric pressure for five hours, an additional amount of 10% palladium on charcoal (0.1 g.) and 10 ml. of water were added. Hydrogenation was continued overnight. The reaction mixture was filtered, the filtrate was evaporated under reduced pressure, the residue was dissolved in 50 ml. of water and chromatographed on a column of CG–50 ($NH_4^+$, 1.2 cm. x 50 cm.). The column was washed with 200 ml. of water and then eluted with 500 ml. of 0.1 N $NH_4OH$, 500 ml. of 0.2 N $NH_4OH$, 900 ml. of 0.5 N $NH_4OH$ and 500 ml. of 1 N $NH_4OH$. The effluents were collected in 10-ml. fraction. Kanamycin B was recovered from fractions 60 to 76 in 32% recovery (459 mg.). Fractions 128–138 were collected, evaporated under reduced pressure and freeze-dried to give 318 mg. (17%, based on carbobenzoxy kanamycin B) of BB–K26 (IVb). M.P. 186–187° C. (dec.). $[\alpha]_D^{29}$ +78° (c.=1.15, $H_2O$). $\gamma_{C=O}$ 1640 cm.$^{-1}$.

*Analysis.*—Calcd. for $C_{22}H_{44}N_6O_{12} \cdot H_2CO_3$ (percent): C, 42.72; H, 7.17; N, 13.00. Found (percent): C, 42.23; H, 7.19; N, 12.37.

TLC (silica gel F254, Ninhydrin), R*f* 0.11 in acetone-AcOH-$H_2O$ (20:6:74); R*f* 0.19 in $CHCl_3$-MeOH-concentrate $NH_4OH$-$H_2O$ (1:4:2:1).

Fractions 201 to 222 were combined, evaporated under reduced pressure and freeze-dried to give 209 mg. (12%) of another active component which was designated BB-K27. M.P. 183–184° C. (dec.). $\gamma_{C=O}$ 1750 cm.$^{-1}$.

*Analysis.*—Calcd. for $C_{22}H_{44}N_6O_{12} \cdot H_2CO_3$ (percent): C, 42.72; H, 7.17; N, 13.00. Found (percent): C, 42.25; H, 6.93; N, 12.18.

TLC (silica gel F254), R*f* 0.15 in acetone-AcOH-$H_2O$ (20:6:74); R*f* 0.07 in $CHCl_3$-MeOH-concentrate $NH_4OH$-$H_2O$ (1:4:2:1).

Example 11

Preparation of L(—)-γ-amino-α-hydroxybutyric acid from DL-α-hydroxy-γ-phthalimidobutyric acid.—(A) Dehydroabietylammonium L-α-hydroxy-γ-phthalimidobutyrate: To a solution of 25 g. (0.1 mole) of 2-hydroxy-γ-phthalimidobutyric acid[3] in 200 ml. of ethanol was added a solution of 29 g. (0.1 mole) of dehydroabietylamine in 130 ml. of ethanol. The solution was shaken vigorously for a minute and stood at room temperature for five hours during which time fine needles crystallized out. The crystals were collected by filtration, washed with 50 ml. of ethanol and air-dried to obtain 30.1 g. (56%) of a diastereomer of the dehydroabietylamine salt. M.P. 93–94° C. $[\alpha]_D^{24}$ +15° (c.=2.5, MeOH). Recrystallization from 300 ml. of ethanol gave 23.2 g. (43%) of the pure product. M.P. 94–95° C. $[\alpha]_D^{24}$ +10.8° (c.=2.5, MeOH). Further recrystallization did not change the melting point and the specific rotation.

*Analysis.*—Calcd. for $C_{32}H_{42}N_2O_5 \cdot H_2O$ (percent): C, 69.54; H, 8.02; N, 5.07. Found (percent): C, 69.58; H, 8.08; N, 5.07.

(B) L-(—)-γ-amino-α-hydroxybutyric acid: To a solution of 1.5 g. (0.014 mole) of sodium carbonate in 40 ml. of water were added 5.3 g. (0.01 mole) of dehydroabietylammonium-L-α-hydroxy-γ-phthalimidobutyrate and 60 ml. of ether. The mixture was shaken vigorously until all of the solid had dissolved. The ether layer was separated. The aqueous solution was washed twice with 20-ml. portions of ether and evaporated to 15 ml. under reduced pressure. To the concentrate was added 10 ml. of concentrated hydrochloric acid and the mixture was refluxed for ten hours. After cooling, separated phthalic acid was removed by filtration. The filtrate was evaporated under reduced pressure. The residue was dissolved in 10 ml. of water and the solution was evaporated to dryness. This operation was repeated twice to remove excess hydrochloric acid. The residual syrup was dissolved in 10 ml. of water and filtered to remove a small amount of insoluble phthalic acid. The filtrate was adsorbed on a column of IR-120 (H+, 1 cm. x 35 cm.), the column was washed with 300 ml. of water and eluted with 1 N ammonium hydroxide solution. The eluate was collected in 15-ml. fraction. The Ninhydrin positive fractions 10 to 16 were combined and evaporated under reduced pressure to give a syrup which crystallized gradually. The crystals were triturated with ethanol, filtered and dried in a vacuum desiccator to give 0.78 g. (66%) of L-(—)-γ-amino-α-hydroxybutyric acid. M.P. 206–207° C. $[\alpha]_D^{24}$ -29° (c.=2.5, $H_2O$). The IR spectrum was identical with the authentic sample which was obtained from ambutyrosin.

Example 12

Preparation of the monosulfate salt of 1-[L-(—)-γ-amino-α-hydroxybutyryl]kanamycin A or B.—One mole of 1-[L-(—)-γ-amino-α-hydroxybutyryl]kanamycin A or B is dissolved in 1 to 3 liters of water. The solution is filtered to remove any undissolved solids. To the chilled and stirred solution is added one mole of sulfuric acid dissolved in 500 ml. of water. The mixture is allowed to stir for 30 minutes, following which cold ethanol is added to the mixture till precipitation occurs. The solids are collected by filtration and are determined to be the desired monosulfate salt.

Example 13

Preparation of the disulfate salt of 1-[L-(—)-γ-amino-α-hydroxybutyryl]kanamycin A (BB-K8·$2H_2SO_4$).—Thirty-five grams of 1-[L-(—)-γ-amino-α-hydroxybutyryl]kanamycin A (as the monobicarbonate trihydrate) was dissolved in 125 ml. of deionized water. A pH of approximately 9.0 was noted. The pH was lowered to 7–7.5 with 50% v./v. sulfuric acid.

Eight and one-half grams of Darco G-60 (activated charcoal) was added and the mixture was slurried at ambient room temperature for 0.5 hour. The carbon was removed by suitable filtration and washed with 40 ml. of water. The water wash was added to the filtrate.

The combined filtrate-wash above was adjusted to pH 2–2.6 with 50% v./v. sulfuric acid. A large amount of carbon dioxide was evolved. The solution was left at house vacuum with stirring for 20 minutes to expel additional carbon dioxide.

Eight and one-half grams of Darco G-60 was added to the degassed solution. The mixture was slurried for 0.5 hour at ambient room temperature. The carbon was removed by suitable filtration and washed with 35 ml. of deionized water. The water wash was added to the filtrate.

The combined filtrate-wash was adjusted to pH 1–1.3 with 50% v./v. sulfuric acid. This solution was added with rapid stirring over a 10 minute period to 600–800 ml. of methanol (3–4 volumes of methanol). The mixture was stirred for 5 minutes at pH 1–1.3, passed through a 100 mesh screen, stirred for 2 minutes and allowed to settle for 5 minutes. Most of the supernatant was decanted. The remaining slurry was suitably filtered, washed with 200 ml. of methanol and vacuum dried at 50° C. for 24 hours. The yield of amorphous BB-K8 (dihydrogen sulfate)$_2$ was 32–34 grams; $[\alpha]_D^{22}$ $H_2O$=+74.75, decomposition at 220–230° C.

Elemental analysis (on dry basis*)

| | Found | Theory |
|---|---|---|
| Percent C | 32.7, 33.5, 32.3 | 33.5 |
| Percent N | 8.78, 8.7, 8.2, 8.8 | 8.97 |
| Percent S | 8.75, 8.9, 7.8, 8.85 | 8.2 |
| Percent ash | Nil | |

*Karl Fisher water content: 2.33, 1.79, 2.87% (theory for monohydrate is 2.25% water). This salt is hygroscopic but not diliquescent. After storage of an aliquot in air at room temperature for 18 hours the water content ncreased to 9.55, 9.89% (theory for a pentahydrate is 10.33% water).

We claim:
1. A compound having the formula

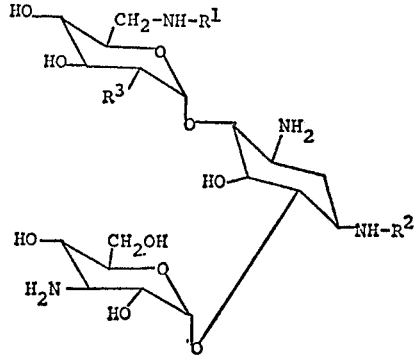

in which $R^1$ is

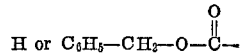

---
[3] Y. Saito et al., Tetrahedron Letters, 1970, 4863.

$R^2$ is L-(—)-γ-amino-α-hydroxybutyryl or L-(—)-γ-benzyloxycarbonylamino-α-hydroxybutyryl, and $R^3$ is OH or $NH_2$; or a nontoxic pharmaceutically acceptable acid addition salt thereof.

2. The compound of claim 1 wherein $R^1$ is

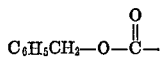

$R^2$ is L-(—)-γ-benzyloxycarbonylamino-α-hydroxybutyryl and $R^3$ is OH.

3. The compound of claim 1 wherein $R^1$ is

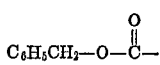

$R^2$ is L-(—)-γ-benzyloxycarbonylamino-α-hydroxybutyryl and $R^3$ is $NH_2$.

4. The compound of claim 1 wherein $R^1$ is H, $R^2$ is L-(—)-γ-amino-α-hydroxybutyryl and $R^3$ is OH; or a nontoxic pharmaceutically acceptable acid addition salt thereof.

5. The compound of claim 1 wherein $R^1$ is H, $R^2$ is L-(—)-γ-amino-α-hydroxybutyryl and $R^3$ is $NH_2$; or a nontoxic pharmaceutically acceptable acid addition salt thereof.

6. The monosulfate salt of the compound of claim 4.
7. The monosulfate salt of the compound of claim 5.
8. The disulfate salt of the compound of claim 4.
9. The disulfate salt of the compound of claim 5.
10. The mono or polyhydrates of the compound of claim 8.
11. The mono or polyhydrates of the compound of claim 9.
12. The mono or polyhydrates of the compounds of claim 4.
13. The mono or polyhydrates of the compounds of claim 5.

References Cited
UNITED STATES PATENTS

| | | | |
|---|---|---|---|
| 3,032,547 | 5/1962 | Rothrock et al. | 260—210 K |
| 3,652,535 | 3/1972 | Keil et al. | 260—210 AB |

JOHNNIE R. BROWN, Primary Examiner

U.S. Cl. X.R.

99—2; 260—210 K; 424—181